United States Patent [19]

Barchus

[11] Patent Number: 4,566,663
[45] Date of Patent: Jan. 28, 1986

[54] OVERHEAD PIVOTAL MOUNTING ASSEMBLY FOR TELEVISION SET

[75] Inventor: David D. Barchus, 4406 NE. 49th Ter., Kansas City, Mo. 64119

[73] Assignee: David Duane Barchus, Kansas City, Mo.

[21] Appl. No.: 594,998

[22] Filed: Mar. 29, 1984

[51] Int. Cl.$^4$ ........................................... F16M 11/14
[52] U.S. Cl. ................................... 248/324; 248/181; 248/288.5
[58] Field of Search .................... 248/324, 280.1, 122, 248/343, 345, 288.3, 288.5, 181

[56] References Cited

U.S. PATENT DOCUMENTS

| 86,173 | 1/1869 | Maynard | 248/288.3 |
|---|---|---|---|
| 790,540 | 5/1905 | Valentine | 248/288.5 |
| 880,415 | 2/1908 | Stevens | 248/324 |
| 1,333,432 | 3/1920 | Maier | 248/288.5 |
| 1,463,668 | 7/1923 | Caffrey | 248/447.2 |
| 1,883,796 | 10/1932 | King | 248/181 |
| 2,123,125 | 7/1938 | Trippe | 248/288.5 |
| 2,439,194 | 4/1948 | Wild | 248/181 |
| 3,206,853 | 9/1965 | Esumi | 248/181 |
| 3,423,089 | 1/1969 | Andis | 248/343 |
| 3,958,904 | 5/1976 | Rusbach | 248/181 |
| 4,019,710 | 4/1977 | O'Connor | 248/288.3 |

FOREIGN PATENT DOCUMENTS

| 825171 | 7/1949 | Fed. Rep. of Germany | 248/181 |
|---|---|---|---|
| 1033442 | 7/1953 | France | 248/181 |

Primary Examiner—Reinaldo P. Machado
Assistant Examiner—Alvin Chin-Shue
Attorney, Agent, or Firm—Warren Williams

[57] ABSTRACT

An adjustable mount which is particularly useful in attaching an appliance such as a television set or the like in a movable vehicle. The mount is operable to permit swinging of the appliance to and from any one of a number of preselected positions and for holding the appliance in the selected position. The mount incorporates a pair of mounting brackets, one of the brackets having a socket and the other bracket a ball presenting a ball-and-socket joint between the brackets. The socket has a centrally located opening and the one bracket has a slotted disc mounted thereon adjacent the opening. A bolt extends through the ball, the opening in the socket and through the slot in the disc. The bolt has a head on one end and a nut on the opposite end. With the nut loosened the brackets are swingably interconnected for positioning a supported appliance. Tightening the nut clamps the ball-and-socket joint to hold the appliance in the selected position.

2 Claims, 6 Drawing Figures

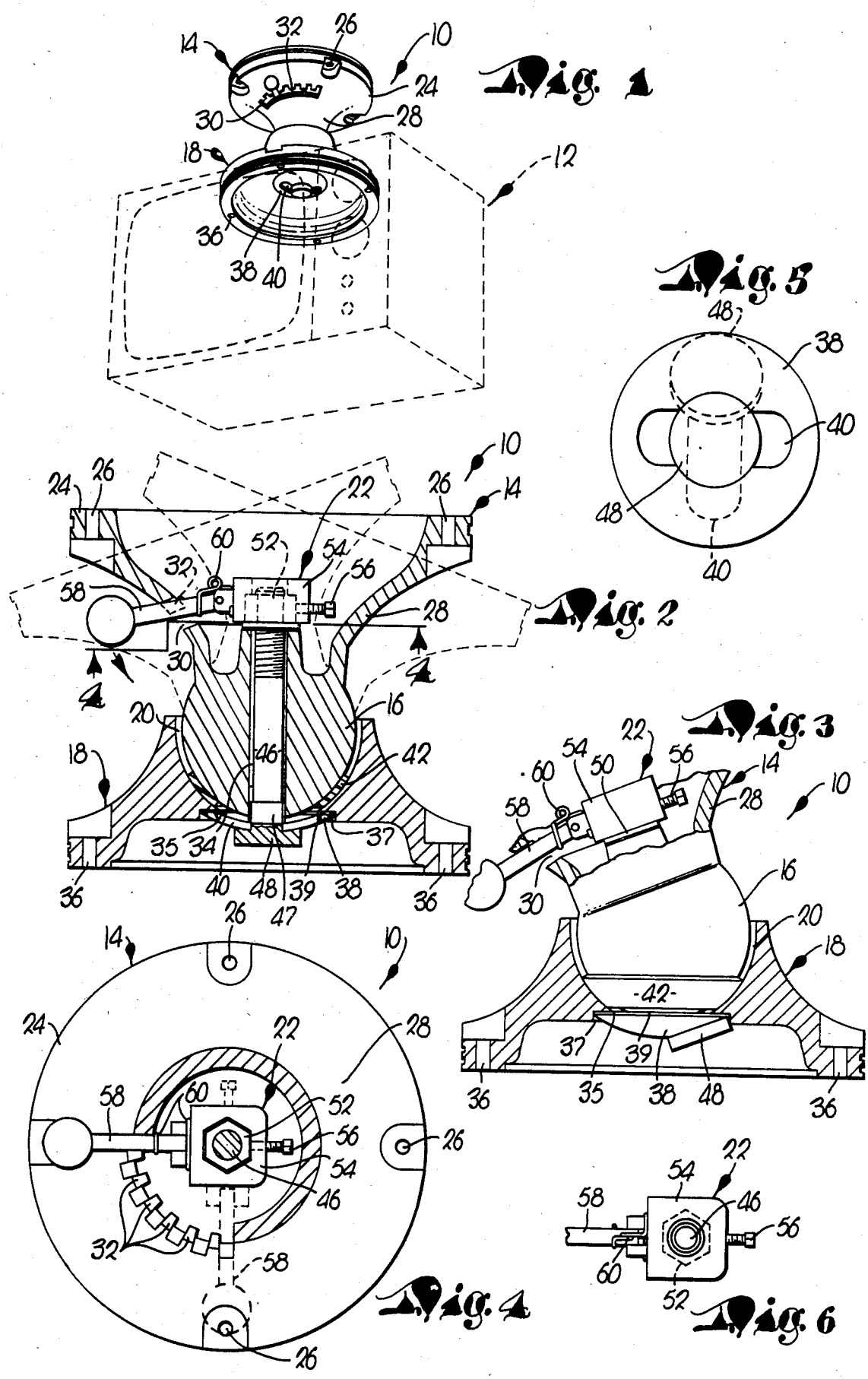

OVERHEAD PIVOTAL MOUNTING ASSEMBLY FOR TELEVISION SET

BACKGROUND OF THE INVENTION

1. Field of the Invention

This invention relates to an adjustable mount for an article such as a television set or the like, which allows the article to be rotated, tilted, and locked into the desired orientation.

2. Description of the Prior Art

In a movable vehicle, such as a mobile home, van, camper, boat, etc., it is often desirable to mount therein an appliance, such as a television, clock, speaker or the like. As experienced travelers appreciated, it is necessary to firmly secure a television set to prevent damage to the set during vehicle movement. Additionally, in environments where space is limited, such as a hospital or motel room, it is often desirable that a television set be mounted to a ceiling in such a fashion that the television can be oriented for the best viewing.

Thus, it is desirable that a mount for an appliance be easily adjustable to properly orient the appliance. Further, particularly when used in a movable vehicle, it is preferable that the mount firmly secure the supported appliance in the desired orientation. Although appliance mounts have been proposed in the past which are adjustable, all are deficient in their ability to firmly secure the supported appliance in the selected orientation. Therefore, it would be a significant advance in the art if a mount were provided which was adjustable and would lock a supported article firmly in place.

SUMMARY OF THE INVENTION

The mounting assembly of the present invention is adapted for supporting many types of appliances in different environments, but is particularly useful for supporting a television set for use in a movable vehicle. The mount hereof allows a supported appliance to be rotated and tilted to a desired orientation. With the appliance positioned as desired, the mount is locked in place to prevent movement of the appliance during vehicle motion.

Broadly speaking, the mount of the present invention includes a pair of brackets, one of the brackets having a socket and the other bracket a ball to present a ball-and-socket joint between the brackets. The ball-and-socket joint permits relative swinging movement of the brackets to and from any one of a number of preselected positions. The mount includes a bolt extending through the ball having a head on one end and a nut on the other end. Tightening the nut releasably holds the ball in the socket, locking a supported appliance in the selected position.

Preferably, a handle is attached to the nut for manually tightening or loosening the nut. The socket has an opening for clearing the one end of the bolt and the bolt is threaded through a slotted disc disposed adjacent the opening. With the nut on the bolt loosened, the brackets are relatively rotatable and movement of the bolt in the slot of the disc allows the brackets to tilt relative each other. While the mount of the present invention has been found particularly useful for supporting a television set in a movable vehicle, those skilled in the art will appreciate that the mount may be used in a wide variety of applications.

BRIEF DESCRIPTION OF THE DRAWING

FIG. 1 is a perspective view of the mount of the present invention secured to the ceiling and shows in phantom a supported television set;

FIG. 2 is a vertical sectional view of the mount secured to a table top or the like, and depicts in phantom the tiltable movement of the upper bracket while the lower bracket is held stationary;

FIG. 3 is a fragmentary, elevational view, in partial section, of the mount illustrated in FIG. 2;

FIG. 4 is a sectional view taken along line 4—4 of FIG. 2;

FIG. 5 is a plan view of the slotted disc and bolt head of the present invention and shows in phantom a second position of the disc and bolt head; and FIG. 6 is a fragmentary plan view of the adjustment cap and a portion of the handle of the present invention.

DESCRIPTION OF THE PREFERRED EMBODIMENT

Turning now to the drawing, a mount 10 particularly well suited for supporting a television set 12 is illustrated. Broadly speaking, the mount 10 includes a base bracket 14 having a ball 16 secured thereto, a swivel bracket 18 incorporating a socket 20, and a releasable holding mechanism 22 operable for preventing rotation of the ball 16 in the socket 20.

The base bracket 14 presents an annular plinth 24 which is either secured to the ceiling as illustrated in FIG. 1, or is attached to a supported appliance (FIG. 2). To this end, the plinth 24 has a plurality of recesses having bores 26 extending therethrough for receiving a fastening device such as a lag screw or bolt. An arcuate surface 28 extends convergingly inward from the plinth 24 and terminates in the ball 16 (see FIG. 2). As shown in FIG. 1, surface 28 includes an elongated channel 30 having a plurality of teeth 32 extending therein. The ball 16 is preferably an integral part of the base bracket 14 and presents an elongated bore 34 extending generally axially therethrough.

The swivel bracket 18 is similar in appearance to the base bracket 14 and has a plurality of recesses presenting apertures 36 therethrough. A fastening device, such as a lag screw or bolt, is received through the respective apertures 36 for bolting the television set 12 to the swivel bracket 18 as shown in FIG. 1, or for securing the swivel bracket 18 to a table top or the like (FIGS. 2, 3). The bracket 18 has an opening 35 at a central, lowermost location and a countersunk portion 37 around the opening 35 (FIGS. 2-3). A concavo-convex disc 38 is fitted in the countersunk portion 37 with a resilient spacer 39 interposed therebetween as illustrated in FIG. 2. The disc 38 is preferably rotatable relative the swivel bracket 18. Further, the disc 38 presents an elongated slot 40 as shown in FIG. 5. An annular resilient pad 42 of synthetic resin material is disposed between the ball 16 and socket 20 (FIGS. 2-3).

The holding mechanism 22 includes a bolt 46 extending through the bore 34 of the ball 16 (see FIG. 2). One end of the bolt 46 extends through the slot 40 of the disc 38 and terminates in an enlarged head 48. Preferably, a length 47 of the shaft 46 adjacent the head 48 is square in cross-section, and the corresponding portion of the bore 34 is complementally square in cross-section to prevent rotation of the shaft 46 in the bore 34 (FIG. 2).

The other end of the shaft 46 is threaded and has received thereon a washer 50 and a nut 52. A cap 54 having a hexagonal in cross-section aperture is engagingly mounted onto the nut 52 and secured to the nut 52 by the set screw 56. A pair of parallel flanges extend radially outward from the cap 54 and have pivotally mounted therebetween an elongated handle 58. The handle 58 extends outwardly through the channel 30 of the bracket 14. A spring 60 interconnects the flanges and handle 58, yieldably upwardly biasing the handle 58 towards the teeth 32.

In use, the television set 12 is preferably mounted to the swivel bracket 18, and the base bracket 14 is preferably mounted to a support structure (such as the ceiling, floor, table, etc.). As those skilled in the art will appreciate, the television set 12 might alternatively be mounted to the base bracket 14 and the swivel bracket 18 mounted to a support surface, without loss of utility. As shown in FIG. 2, with the nut 52 tightened, the washer 50 abuts the upper portion of the ball 16 and the head 48 adjoins the disc 38. Tightening the nut 52 compresses the pad 42 between the ball 16 and socket 20 and relative movement of the ball 16 in the socket 20 is prevented. To reposition the television set 12 when attached to the ceiling as shown in FIG. 1, the handle 58 is depressed out from between adjacent teeth 32 and rotated in the channel 30 (left to right as shown in FIG. 1). This movement of the handle 58 in turn imparts rotational movement to the nut 52 through the cap 54, thereby loosening the nut 52. With the nut 52 loosened, the swivel bracket 18 is easily rotatable relative the base 14. Further, as seen in FIGS. 3, 5, swivel brackets 18 is tiltable relative the base bracket 14 with the portion of the bolt 46 adjacent the head 48 sliding within the groove 40. Advantageously, the disc 38 is rotatable within the countersunk portion 37 to allow tilting movement in any direction.

With the swivel bracket 18 and attached television set 12 rotated and tilted as desired, the mount 10 is easily locked in place. That is, the handle 58 is simply moved out from between the teeth 32 and axially rotated in the tightening direction (right to left in FIG. 1). This movement of the handle 58 tightens the nut 52 thereby drawing the socket and ball 20, 16 together. When tightened, the handle 58 is released and the spring 60 biases the handle 58 upwardly towards the teeth 32. Positioning the handle 58 between adjacent teeth 32 prohibits rotation of the handle 58 in the channel 30, preventing accidential loosening of the nut 52 and holding mechanism 22. Thus, it will be appreciated that the mount 10 of the present invention is easily manipulated to lock a television set or other appliance in a desired orientation.

I claim:

1. An article mount comprising:

a first bracket having a socket;

a second bracket having a ball in said socket, presenting a ball-and-socket joint between the brackets, said ball and said first bracket having normal relative movement in a plurality of directions, permitting relative swinging movement of said first bracket and said second bracket to and from any one of a number of preselected positions;

a threaded bolt associated with said ball and said socket;

a nut threadably engaging said bolt for releasably clamping said first bracket and said second bracket in any one of said positions;

an elongated handle coupled to said nut for selective tightening of the latter, said handle being swingable in an arc to turn said nut about said bolt; and an elongated channel associated with said second bracket, said channel having a plurality of spaced, aligned teeth extending transversely therein, a portion of said handle being movable longitudinally of said channel for turning said nut about said bolt, said portion of said handle also being movable toward a position between an adjacent pair of said teeth such that the latter precludes rotation of said nut relative to said bolt.

2. The invention of claim 1; and means yieldably biasing said portion of said handle in a direction toward said teeth.

* * * * *